United States Patent Office 3,313,807
Patented Apr. 11, 1967

3,313,807
5'-SUBSTITUTED STEROIDAL ISOXAZOLES OF THE PREGNANE SERIES
Pietro De Ruggieri, Carmelo Gandolfi, and Umberto Guzzi, Milan, Italy, assignors to Ormonoterapia Richter S.p.A., Milan, Italy, a corporation of Italy
No Drawing. Filed Jan. 28, 1965, Ser. No. 428,863
Claims priority, application Italy, Feb. 1, 1964, 2,246/64
1 Claim. (Cl. 260—239.55)

The present invention relates to compounds of the general formula

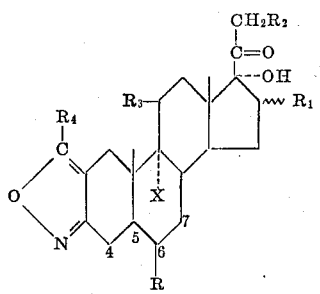

wherein R is hydrogen, methyl, fluoro or chloro; $R_1$ is hydrogen, α-methyl, or β-methyl; $R_2$ is hydrogen, hydroxy, or acyloxy, the acyl radical of which is derived from a carboxylic acid having from one to ten carbon atoms; $R_3$ is hydrogen, keto, or β-hydroxy; $R_4$ is amino, alkylamino aralkylamino, acylamino, hydroxy, acyloxy, the acyl radical of which is derived from a carboxylic acid having from two to ten carbon atoms, or alkoxy having from one to four carbon atoms; X is hydrogen or fluoro and the bonds between the carbon atoms in the positions 4, 5 and 6, 7 are single or double.

These compounds are useful therapeutic agents because of their high progrestational and corticoid activity.

As starting materials were employed the compounds of the formula

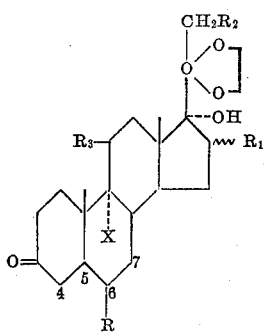

wherein R is hydrogen, methyl, chloro or fluoro; $R_1$ is hydrogen, α-methyl or β-methyl; $R_2$ is hydrogen or hydroxy; $R_3$ is hydrogen, keto, or β-hydroxy; X is hydrogen or fluoro and the carbon atoms in the position 4, 5 and 6, 7 are single or double bonded or the compounds of the formula

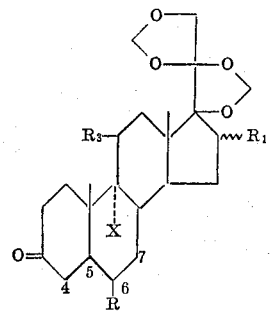

wherein R is hydrogen, methyl, fluoro or chloro; $R_1$ is hydrogen α-methyl, or β-methyl; $R_3$ is hydrogen, keto, or β-hydroxy; X is hydrogen or fluoro and the bonds between the carbon atoms in the position 4, 5 and 6, 7 are single or double.

The groups 20,20-ethylendioxy and 17,20-20,21-bis-methylendioxy are used to protect particularly unstable or reactive groups of the steroidal molecule and they are easily eliminated at the end of the synthesis, restoring the characteristic side-chain in the 17β position.

The reaction sequence, starting with one of the above compounds, is carried out on the steroidal ring A, the other groups being protected or non-reactive, and it may be illustrated by the following equations:

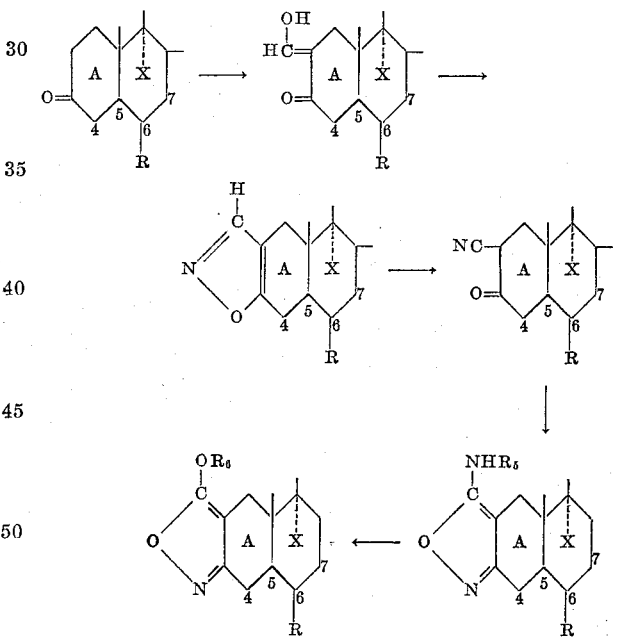

wherein $R_5$ is hydrogen, alkyl, aralkyl or acyl; $R_6$ is hydrogen, acyl or alkyl and the bond between the carbon atoms in the positions 4, 5 and 6, 7 is single or double.

First, by the action of ethylformate on the 3-keto group, we obtain a 2-hydroxymethylene group, which with hydroxylamine yields a [3,2-d]-isoxazole, from which, through alkaline scission we obtain a 2α-cyano-3-ketone, which with hydroxylamine yields a 5'-amino-[3,2-c]-isoxazole and then through acid hydrolysis, a 5'-hydroxy-[3,2-c]-isoxazole is obtained.

5'-acyl, alkyl and arylamino-[3,2-c]-isoxazoles and 5'-alkoxy and acyloxy-[3,2-c]-isoxazoles may also be prepared.

The following examples are set forth as illustrating, but not as limiting this invention:

EXAMPLE I

A mixture of p-formaldehyde (250 g.), water (750 ml.) and concentrated hydrochloric acid (750 ml.) is stirred for 4 hours and then a suspension of 25 g. of 11β,17α,21 - trihydroxy-16α-methyl-4-pregnene-3,20-dione in 1250 ml. of alcohol free-chloroform is added.

Stirring is continued for 3 hours, after which time the aqueous phase is separated. The chloroform layer is washed with a dilute solution of sodium carbonate and water, dried and evaporated. The crystallization of the resulting solid from methanol provides 16 g. of 17α,20,20,21 - bis(methylendioxy) - 11β - hydroxy - 16α - methyl-4-pregnene-3-one. This material contains no detectable amounts of starting material by thin layer chromatography and the reaction with tetrazolium bleu is negative.

A solution of 5.4 g. of 17α,20,20,21-bis(methylendioxy)-11β-hydroxy-16α-methyl-4-pregnene-3-one in 200 ml. of dried benzene is treated with 4 ml. of freshly distilled ethylformate. The air in the system is replaced with nitrogen and 2.7 g. of sodium hydride (as a 50% dispersion in mineral oil) are added. The mixture is stirred at room temperature overnight. Dry ether is added, the sodium salt is filtered and it is dried under a high vacuum; after 2 hours it is decomposed with a saturated aqueous solution of sodium dihydrogen phosphate and extracted with benzene.

The benzene extracts, washed with water, are evaporated to dryness under reduced pressure. The residue is triturated with methanol to give as a crystalline solid, 17α,20,20,21 - bis(methylendioxy) - 11β - hydroxy - 2-hydroxymethylene - 16α-methyl-4-pregnene-3-one, which is used in the subsequent step of the synthesis without further purification.

The 17α,20,20,21 - bis(methylendioxy)11β-hydroxy-2-hydroxymethylene - 16α - methyl-4-pregnene-3-one (0.01 mole) is dissolved in 120 ml. of ethanol and treated with a solution of hydroxylamine hydrochloride (0.011 mole) in water. After half an hour the reaction with ferricchloride is negative. The solvent is concentrated under vacuum and the hydrochloric acid is neutralized with a 10% solution of sodium bicarbonate. Dilution with water gives a precipitate, which is filtered and dried over a steam bath. This product is triturated with methanol to give 17α,20,20,21 - bis(methylendioxy)-11β-hydroxy-16α-methyl-4-pregnene-[2,3-d]-isoxazole, which is used in the subsequent step of the synethsis without further purification.

A solution of 17α,20,20,21-bis(methylendioxy)-11β-hydroxy - 16α - methyl-4-pregnene-[2,3-d] - isoxazole is treated with sodium ethoxide in ethanol. The mixture is stirred at room temperature for 2 hours. The sodium salt of 17α,20,20,21-bis(methylendioxy) - 11β - hydroxy-2α-cyano-16α-methyl-4-pregnene-3-one is isolated by the addition of dry ether and filtration. The product is dried in high vacuum and after solution in water it is neutralized with a saturated solution of sodium dihydrogen phosphate. After filtration the solid is washed with water and dried on a steam bath. Crystallization from methanol gives 17α,20,20,21-bis(methylendioxy)-2α-cyano-11β-hydroxy-16α-methyl-4-pregnene-3-one, which is used in the subsequent step of the synthesis without further purification.

The 17α,20,20,21-bis(methylendioxy)-11β-hydroxy-2α-cyano-16α-methyl-4-pregnene-3-one (800 mg.) is dissolved in 50 ml. of ethanol and treated with a 10% solution of hydroxylamine acetate in ethanol. The mixture is refluxed for about 3 hours and then concentrated.

The resulting 17α,20,20,21-bis(methylendioxy)-11β-hydroxy-16α-methyl-4-pregnene-[3,2 - c]-isoxazole-5'-amino is isolated by the addition of water and filtered. An aliquot is crystallized from ethyl acetate, which is used in the subsequent step of the synthesis.

The 17α,20,20,21 - bis(methylendioxy)-11β-hydroxy-16α - methyl-4-pregneno-[3,2-c]-isoxazole-5'-amino (800 mg.) is heated in a steam bath with 25 ml. of a 60% aqueous solution of formic acid for about 30 minutes. The excess reagent is removed in vacuo using a water bath at about 70° C. as the source of heat. After dissolution in pyridine the product is precipitated with water and filtered. The residue is flushed 2 times with benzene, once with toluene and then dried in high vacuum to give an amorphous solid which is a mixture of 11β,17α,21-trihydroxy-16α-methyl-20-one-4-pregneno-[3,2 - c]-isoxazole-5'-amino and 21-formyloxy-11β,17α,dihydroxy-16α-methyl-20-one-4-pregneno-[3,2-c]-isoxazole-5'-amino.

500 mg. of this crude product are dissolved in 2.5 ml. of pure methanol and allowed to react with a solution (1.35 N) of sodium methoxide in methanol for 10 minutes at room temperature under a nitrogen atmosphere. The alkoxide is neutralized with acetic acid and the mixture is then taken to dryness. The residue is washed with water, filtered and dried. Crystallization from ethyl acetate gives 11β,17α,21-trihydroxy-16α-methyl-20-one-4-pregneno-[3,2-c]-isoxazole-5'-amino.

A solution of 1.2 g. of 11β,17α,21-trihydroxy-16α-methyl-20-one-4-pregneno-[3,2 - c]-isoxazole-5'-amino in 35 ml. of pure ethanol is treated with benzaldehyde (0.9 ml.) for 12 hours at room temperature; after this time a solid is collected. Crystallization from methanol gives 11β,17α,21-trihydroxy - 16α - methyl-20-one-4-pregneno-[3,2-c]-isoxazole-5'-amino-N-benzylidene. This product treated with pyridine and acetic anhydride gives, after crystallization from ether, 21-acetoxy-11β,17α-dihydroxy-16α - methyl-20-oxo - 4 - pregneno-[3,2-c]-isoxazole-5'-amino-N-benzylidene.

An aliquot of 550 mg. of this compound in acetone is treated with a solution of hydrochloric acid (4 N) for 30 minutes at room temperature and the material which separates is recovered by filtration, dried over phosphorus pentoxide under vacuum to give 21-acetoxy-11β,17α-dihydroxy - 16α - methyl - 20 - one - 4 - pregneno-[3,2-c]-isoxazole-5'-amino.

A solution of 400 mg. of the above compound in 15 ml. of acetone is treated at 0° C. under stirring with 0.5 ml. of chromic acid. After 6 minutes 2 ml. of isopropyl alcohol are added to destroy the excess of the oxidant. The resulting green solution is diluted with water and the precipitate which forms is recovered by filtration, washed with water and dried to give 17α,21-dihydroxy-16α-methyl-11,20-dione-4-pregneno-[3,2 - c] - isoxazole-5'-amino-21-acetate.

In accordance with the above procedures, but starting with the corresponding derivatives there are obtained as products,

[3,2-c]-isoxazole-5'-amino-
11β,17α,21-trihydroxy-4-pregnene-20-one
11β,17α,21-trihydroxy-4-pregnene-20-one-21-acetate
11β,17α,21-trihydroxy-4-pregnene-6α-methyl-9α-fluoro-20-one
11β,17α,21-trihydroxy-4-pregnene-6α-methyl-9α-fluoro-20-one-21-acetate
11β,17α,21-trihydroxy-4-pregnene-6α,16α-dimethyl-9α-fluoro-20-one
11β,17α,21-trihydroxy-4-pregnene-6α,16α-dimethyl-9α-fluoro-20-one-21-acetate
11β,17α,21-trihydroxy-4-pregnene-16β-methyl-9α-fluoro-20-one
11β,17α,21-trihydroxy-4-pregnene-16β-methyl-9α-fluoro-20-one-21-acetate
11β,17α,21-trihydroxy-4-pregnene-16α-methyl-9α-fluoro-20-one
11β,17α,21-trihydroxy-4-pregnene-16α-methyl-9α-fluoro-20-one-21-acetate 11β,17α,21-trihydroxy-4-pregnene-6α-methyl-16α-methyl-9α-fluoro-20-one 11β,17α,21-trihydroxy-4-pregnene-6α-methyl-16α-methyl-9α-fluoro-20-one-21-acetate 17α,21-dihydroxy-4-pregnene-16β-methyl-9α-fluoro-11,20-dione 17α,21-hydroxy-4-pregnene-16β-methyl-9α-fluoro-11,20-dione-21-acetate 17α,21-dihydroxy-4-pregnene-20-one 17α,21-dihydroxy-4-pregnene-20-one-21-acetate 17α,21-dihydroxy-4-pregnene-16β-methyl-20-one-21-acetate 17α,21-dihydroxy-4-pregnene-16β-methyl-20-one 17α,21-dihydroxy-4-pregnene-16α-methyl-20-one 17α,21-dihydroxy-4-pregnene-16α-methyl-20-one-21-acetate 17α,21-dihydroxy-4-pregnene-6α-methyl-20-one 17α,21-dihydroxy-4-pregnene-6α-methyl-20-one-21-acetate 17α,21-dihydroxy-4,6-pregnadiene-6-methyl-20-one 17α,21-dihydroxy-4,6-pregnadiene-6-methyl-20-one-21-acetate.

A solution of 3 g. of 17α,20,20,21-bis(methylendioxy)-11β-hydroxy-16α-methyl-4-pregneno - [3,2-c] - isoxazole-5'-amino in 150 ml. of ethanol (80%) is treated with 15 g. of concentrated sulphuric acid and refluxed for 10 hours. The reaction solution is cooled and neutralized with sodium ethoxide. The mixture is then taken to dryness and washed with hot water and dried again. The amorphous solid (3 g.) is dissolved in pyridine (12 ml.) and treated with acetic anhydride (6 ml.) overnight at room temperature. A mixture of ice and water is then added and the material which separates is recovered by filtration. The product is washed with water and dried. The resulting 17α,20,20,21-bis(methylendioxy)-11β-hydroxy - 16α - methyl - 4 - pregneno-[3,2-c]-isoxazole-5'-acetoxy is separated by chromatography on silica-gel.

A 200 mg. aliquot of the above compound is dissolved in 3 ml. of pure methanol and allowed to react with 0.3 ml. of a 1.35 N solution of sodium methoxide in methanol at room temperature for 10 minutes. The reaction solution is neutralized with acetic acid and the mixture is then taken to dryness. The residue is washed with water, filtered and dried. After crystallization, there is obtained 17α,20,20,21-bis(methylenedioxy) - 11β - hydroxy - 16α-methyl-4-pregneno-[3,2-c]-isoxazole-5'-hydroxy.

A solution of 400 mg. of the above compound in 4 ml. of pyridine is added to the complex formed by the addition of 400 mg. of chromium trioxide to 4 ml. of pyridine. The mixture is stirred until thoroughly mixed and then allowed to stand at room temperature overnight. The reaction mixture is poured into water and the aqueous mixture is extracted with ether and then twice with ethyl acetate. The combined ether and ethyl acetate extracts are washed with dilute aqueous sulphuric acid at about 0° C. and then with water until neutral. The organic solvent layer is then dried, the solvents are evaporated therefrom in vacuo and the residual crystalline material is purified by crystallization to give 17α,20,20,21-bis(methylendioxy) - 16α - methyl - 11,20 - dione-4-pregneno-[3,2-c]-isoxazole-5'-hydroxy.

A solution of 2 g. of 17α,20,20,21-bis(methylendioxy)-11β-hydroxy-16α-methyl-4-pregneno - [3,2-c] - isoxazole-5'-acetoxy in 40 ml. of 80% (v./v.) acetic acid is heated on a steam bath for 30 minutes. The solution is diluted with 100 ml. of water and extracted with ethyl acetate. The ethyl acetate extracts are washed with water and with a saturated solution of sodium bicarbonate, dried and evaporated to dryness in vacuo to give an amorphous solid, which is a mixture of 11β,17α,21-trihydroxy-16α - methyl-20-one-4-pregneno - [3,2-c] - isoxazole-5'-acetoxy - 21 - acetate and 11β,17α,21 - trihydroxy-16α-methyl-20-oxo-4-pregneno - [3,2-c] - isoxazole - 5' - acetoxy. These compounds are separated by thin layer chromatography on silica-gel.

A solution of 500 mg. of 17α,20,20,21-bis(methylendioxy)-11β-hydroxy-16α-methyl - 4 - pregneno-[3,2-c]-isoxazole-5'-acetoxy is refluxed for 1 hour with 10 ml. of 80% (v./v.) acetic acid. The solution is diluted with 70 ml. of water and extracted with ethyl acetate. The ethyl acetate extracts are washed with water and with a saturated sodium bicarbonate solution, dried and evaporated to dryness in vacuo to give, after crystallization, 11β,17α-dihydroxy - 16α - methyl - 20 - one-4-pregneno-[3,2-c]-isoxazole-5'-acetoxy-21-acetate.

A 250 mg. aliquot of the above compound is dissolved in 3 ml. of pure methanol and allowed to react with 0.5 ml. of 1.35 N solution of sodium methoxide in methanol at room temperature under nitrogen atmosphere for 10 minutes. The reaction solution is neutralized with acetic acid and then the mixture is taken to dryness. The residue is washed with water, filtered and dried and after crystallization, there is obtained 11β,17α,21-trihydroxy-16α - methyl-20-one-4-pregneno - [3,2-c] - isoxazole-5'-hydroxy.

In accordance with the above procedures, but starting with the corresponding derivatives there are obtained as produces, [3,2-c]-isoxazole-5'-hydroxy- 11β,17α-21-trihydroxy-4-pregnene-20-one 11β,17α,21-trihydroxy-4-pregnene-20-one-21-acetate 11β,17α,21-trihydroxy-4-pregnene-6α-methyl-9α-fluoro-20-one 11β,17α,21-trihydroxy-4-pregnene-6α-methyl-9α-fluoro-20-one-21-acetate 11β,17α,21-trihydroxy-4-pregnene-6α,16α-dimethyl-9α-fluoro-20-one 11β,17α,21-trihydroxy-4-pregnene-6α,16α-dimethyl-9α-fluoro-20-one-21-acetate 11β,17α,21-trihydroxy-4-pregnene-16β-methyl-9α-fluoro-20-one 11β,17α,21-trihydroxy-4-pregnene-16β-methyl-9α-fluoro-20-one-21-acetate 11β,17α,21-trihydroxy-4-pregnene-16α-methyl-9α-fluoro-20-one 11β,17α,21-trihydroxy-4-pregnene-16α-methyl-9α-fluoro-20-one-21-acetate 11β,17α,21-trihydroxy-4-pregnene-6α-methyl-16β-methyl-9α-fluoro-20-one 11β,17α,21-trihydroxy-4-pregnene-6α-methyl-16β-methyl-9α-fluoro-20-one-21-acetate 17α,21-dihydroxy-4-pregnene-16β-methyl-9α-fluoro-11,20-dione 17α,21-dihydroxy-4-pregnene-16β-methyl-9α-fluoro-11,20-dione-21-acetate 17α,21-dihydroxy-4-pregnene-20-one 17α,21-dihydroxy-4-pregnene-20-one-21-acetate 17α,21-dihydroxy-4-pregnene-16β-methyl-20-one-21-acetate 17α,21-dihydroxy-4-pregnene-16β-methyl-20-one 17α,21-dihydroxy-4-pregnene-16α-methyl-20-one 17α,21-dihydroxy-4-pregnene-16α-methyl-20-one-21-acetate 17α,21-dihydroxy-4-pregnene-6α-methyl-20-one 17α,21-dihydroxy-4-pregnene-6α-methyl-20-one-21-acetate 17α,21-dihydroxy-4,6-pregnadiene-6-methyl-20-one 17α,21-dihydroxy-4,6-pregnadiene-6-methyl-20-one-21-acetate 250 mg. of 17α,20,20,21-bis(methylendioxy)-11β-hydroxy-16α-methyl - 4 - pregneno - [3,2-c] - isoxazole-5'-hydroxy dissolved in 10 ml. of pure methanol are treated with an excess of an ethereal solution of diazomethane. After a violent evolution of nitrogen, the reaction is maintained under constant stirring for one hour. The excess reagent and part of the solvent are removed in vacuo using a water bath as the source of heat. During concentration, the product crystallizes to give 17α,20,20, 21-bis(methylendioxy) - 11β - hydroxy - 16α - methyl-4-pregneno-[3,2-c]-isoxazole-5′-methoxy.

In accordance with the above procedure, but using this time an excess of diazoethane there is obtained the corresponding 5′-ethoxy-derivatives.

In accordance with the above procedure, but starting with the corresponding derivatives there are obtained as products, [3,2-c]-isoxazole-5′-methoxy- and 5-ethoxy- 11β,17α,21-trihydroxy-4-pregnene-20-one
11β,17α,21-trihydroxy-4-pregnene-20-one-21-acetate
11β,17α,21-trihydroxy-4-pregnene-6α-methyl-9α-fluoro-20-one
11β,17α,21-trihydroxy-4-pregnene-6α-methyl-9α-fluoro-20-one-21-acetate
11β,17α,21-trihydroxy-4-pregnene-6α,16α-dimethyl-9α-fluoro-20-one
11β,17α,21-trihydroxy-4-pregnene-6α,16α-dimethyl-9α-fluoro-20-one-21-acetate
11β,17α,21-trihydroxy-4-pregnene-6β-methyl-9α-fluoro-20-one
11β,17α,21-trihydroxy-4-pregnene-16β-methyl-9α-fluoro-20-one-21-acetate
11β,17α,21-trihydroxy-4-pregnene-16α-methyl-9α-fluoro-20-one
11β,17α,21-trihydroxy-4-pregnene-16α-methyl-9α-fluoro-20-one-21-acetate
11β,17α,2-trihydroxy-4-pregnene-6α-methyl-16β-methyl-9α-fluoro-20-one
11β,17α,21-trihydroxy-4-pregnene-6α-methyl-16β-methyl-9α-fluoro-20-one-21-acetate
17α,21-dihydroxy-4-pregnene-16β-methyl-9α-fluoro-11,20-dione
17α,21-dihydroxy-4-pregnene-16β-methyl-9α-fluoro-11,20-dione-21-acetate
17α,21-dihydroxy-4-pregnene-20-one
17α,21-dihydroxy-4-pregnene-20-one-21-acetate
17α,21-dihydroxy-4-pregnene-16β-methyl-20-one-21-acetate
17α,21-dihydroxy-4-pregnene-16β-methyl-20-one
17α,21-dihydroxy-4-pregnene-16α-methyl-20-one
17α,21-dihydroxy-4-pregnene-16α-methyl-20-one-21-acetate
17α,21-dihydroxy-4-pregnene-6α-methyl-20-one
17α,21-dihydroxy-4-pregnene-6α-methyl-20-one-21-acetate
17α,21-dihydroxy-4,6-pregnadiene-6-methyl-20-one
17α,21-dihydroxy-4,6-pregnadiene-6-methyl-20-one-21-acetate.

A solution of 500 mg. of 17α,20,20,21-bis(methylendioxy)-11β-hydroxy - 16α - methyl-4-pregneno-[3,2-c]-isoxazole-5′-amino in 4 ml. of pyridine is treated with 2 ml. of acetic anhydride. The mixture is allowed to stand overnight at room temperature. A mixture of ice and water is then added and 17α,20,20,21-bis(methylendioxy)-11β-hydroxy-16α-methyl - 4 - pregneno-[3,2-c]-isoxazole-5′-acetamido is isolated by the addition of water and filtration. After crystallization from methanol the product is used in the subsequent step of the synthesis without further purification.

In accordance with the above procedure, but using another acylating reagent in place of acetic anhydride there is obtained the corresponding N-acyl derivative.

The 17α,20,20,21-bis(methylendioxy)-16α-methyl-11β-hydroxy-4-pregneno-[3,2-c]-isoxazole-5′ - acetamido (500 mg.) is heated in a steam bath with 25 ml. of a 50% aqueous solution of acetic acid for about 3 hours. The excess reagent is removed in vacuo using a water bath as the source of heat. The residue is treated with a solution of sodium methoxide in methanol for 10 minutes at room temperature. The alkoxide is neutralized with acetic acid and the mixture is then taken to dryness. The residue is washed with water, filtered and dried to give 11β,17α,21-trihydroxy-16α-methyl-20-one - 4 - pregneno - [3,2-c] - isoxazole-5′-acetamido. An aliquot of this product treated with pyridine and acetic anhydride gives 21-acetate-11β,17α-dihydroxy-16α-methyl-20-one-4-pregneno-[3,2-c] - 5′-acetamido.

In accordance with the above procedures, but starting with the corresponding derivatives there are obtained as products, [3,2-c]-isoxazole-5′-acylamino- 11β,17α,21-trihydroxy-4-pregnene-20-one
11β,17α,21-trihydroxy-4-pregnene-20-one-21-acetate
11β,17α,21-trihydroxy-4-pregnene-6α-methyl-9α-fluoro-20-one
11β,17α,21-trihydroxy-4-pregnene-6α-methyl-9α-fluoro-20-one-21-acetate
11β,17α,21-trihydroxy-4-pregnene-6α,16α-dimethyl-9α-fluoro-20-one
11β,17α,21-trihydroxy-4-pregnene-6α-16α-dimethyl-9α-fluoro-20-one-21-acetate
11β,17α,21-trihydroxy-4-pregnene-16β-methyl-9α-fluoro-20-one
11β,17α,21-trihydroxy-4-pregnene-16β-methyl-9α-fluoro-20-one-21-acetate
11β,17α,21-trihydroxy-4-pregnene-16β-methyl-9α-fluoro-20-one
11β,17α,21-trihydroxy-4-pregnene-16α-methyl-9α-fluoro-20-one
11β,17α,21-trihydroxy-4-pregnene-16α-methyl-9α-fluoro-20-one-21-acetate
11β,17α,21-trihydroxy-4-pregnene-6α-methyl-16β-methyl-9α-fluoro-20-one
11β,17α,21-trihydroxy-4-pregnene-6α-methyl-16β-methyl-9α-fluoro-20-one-21-acetate
17α,21-dihydroxy-4-pregnene-16β-methyl-9α-fluoro-11,20-dione
17α,21-dihydroxy-4-pregnene-16β-methyl-9α-fluoro-11,20-dione-21-acetate
17α,21-dihydroxy-4-pregnene-20-one
17α,21-dihydroxy-4-pregnene-20-one-21-acetate
17α,21-dihydroxy-4-pregnene-16β-methyl-20-one-21-acetate
17α,21-dihydroxy-4-pregnene-16β-methyl-20-one
17α,21-dihydroxy-4-pregnene-16α-methyl-20-one
17α,21-dihydroxy-4-pregnene-16α-methyl-20-one-21-acetate
17α,21-dihydroxy-4-pregnene-6α-methyl-20-one
17α,21-dihydroxy-4-pregnene-6α-methyl-20-one-21-acetate
17α,21-dihydroxy-4,6-pregnadiene-6-methyl-20-one
17α,21-dihydroxy-4,6-pregnadiene-6-methyl-20-one-21-acetate A suspension of 1 g. of 17α,20,20,21-bis(methylendioxy)-11β-hydroxy-16α-methyl-4-pregneno - [3,2-c] - isoxazole-5′-amino is refluxed with toluene and with elimination of water. After 1 hour, 2 ml. of benzaldehyde are added and the resulting mixture is refluxed for 4 hours while the elimination of water is continued. The solvent is then distilled in vacuo and the residue is flushed 4 times with a mixture of ether-hexane (1:5 v./v.) and then dried in vacuo. After crystallization from ether-methanol, there is obtained pure 17α,20,20,21-bis(methylendioxy)-11β-hydroxy-16α-methyl-4-pregneno-[3,2-c]-isoxazole - 5′-N-benzylidene.

Another method of preparing the 5′-N-benzylidene derivative is the following:

A solution of 1 g. of 17α,20,20,21-bis(methylendioxy)-6α-methyl-4-pregneno-[3,2-c]-isoxazole-5′-amino is dissolved in methanol and treated under stirring with 1 ml. of benzaldehyde overnight. The material which separates during this time is recovered by filtration, washed with methanol and dried to give 17α,20,20,21-bis(methylendioxy)-6α-methyl-4-pregneno-[3,2-c]-5′-N-benzylidene.

In accordance with the above procedure, but using an equivalent quantity of acetaldehyde in place of benzaldehyde there is obtained the corresponding 5′-N-ethylidene.

A solution of 500 mg. of 17α,20,20,21-bis(methylendioxy)-11β-hydroxy-16α-methyl-4-pregneno - [3,2-c] - isoxazole-5′-N-benzylidene in 15 ml. of tetrahydrofuran is treated with a suspension of 200 mg. of lithium aluminum hydride in 10 ml. of tetrahydrofuran. The mixture is refluxed with stirring for one hour. The excess reagent is destroyed with ethyl acetate. This solution is extracted with ethyl acetate, washed 2 times with a dilute solution of hydrochloric acid and 3 times with a 10% solution of sodium bicarbonate and then to neutrality with water, dried and evaporated to dryness in vacuo. The crystallization of the resulting product yields 17α,20,20,21-bis methylendioxy)-11β-hydroxy-16α - methyl - 4 - pregneno-[3,2-c]-isoxazole-5'-N-benzyl.

In accordance with the above procedure, but starting with 17α,20,20,21-bis(methylendioxy)-6α-methyl-4 - pregnene-[3,2-c]-isoxazole-5'-N-ethylidene, we obtain 17α,20,20,21-bis(methylendioxy)-6α-methyl-4-pregnene - [3,2-c]-isoxazole-5'-N-ethyl.

A solution of 1.5 g. of 17α,20,20,21-bis(methylenedioxy)-11β-hydroxy-16α-methyl-4-pregneno - [3,2-c] - isoxazole-5'-N-benzyl in 20 ml. of 80% (v./v.) acetic acid is refluxed for 1 hour. The solution is diluted with ice water (100 ml.) and extracted with ethyl acetate. The ethyl acetate extracts are washed with water and with a saturated sodium bicarbonate solution, dried and evaporated to dryness in vacuo. The crystallization of the resulting product yields 11β,17α,21-trihydroxy-16α-methyl-20-one-4-pregneno-[3,2-c]-isoxazole-5'-N-benzyl-21-acetate.

A 750 mg. aliquot of this product is dissolved in methanol (5 ml.) and allowed to react with 1.5 ml. of a 1.25 N solution of sodium methoxide in methanol at room temperature under nitrogen atmosphere for 10 minutes. The alkoxide is neutralized with acetic acid and the mixture is then taken to dryness. The residue is washed with water, filtered and dried to give an amorphous product, whose crystallization yields 11β,17α,21-trihydroxy-16α-methyl-20-one-4-pregneno-[3,2-c]-isoxazole-5'-N-benzyl.

In accordance with the above procedures, but starting with the corresponding derivatives, there are obtained as products, [3,2-c]-isoxazole-5'-N-benzylidene - [3,2-c] - isoxazole-5'-N-benzyl-[3,2-c]-isoxazole-5' - N - ethylidene- and [3,2-c]-isoxazole-5'-N-ethyl- 11β,17α,21-trihydroxy-4-pregnene-20-one
11β,17α,21-trihydroxy-4-pregnene-20-one-21-acetate
11β,17α,21-trihydroxy-4-pregnene-6α-methyl-9α-fluoro-20-one
11β,17α,21-trihydroxy-4-pregnene-6α-methyl-9α-fluoro-20-one-21-acetate
11β,17α,21-trihydroxy-4-pregnene-6α,16α-dimethyl-9α-fluoro-20-one
11β,17α,21-trihydroxy-4-pregnene-6α,16α-dimethyl-9α-fluoro-20-one-21-acetate
11β,17α,21-trihydroxy-4-pregnene-16β-methyl-9α-fluoro-20-one
11β,17α,21-trihydroxy-4-pregnene-16β-methyl-9α-fluoro-20-one-21-acetate
11β,17α,21-trihydroxy-4-pregnene-16α-methyl-9α-fluoro-20-one
11β,17α,21-trihydroxy-4-pregnene-16α-methyl-9α-fluoro-20-one-21-acetate
11β,17α,21-trihydroxy-4-pregnene-6α-methyl-16β-methyl-9α-fluoro-20-one
11β,17α,21-trihydroxy-4-pregnene-6α-methyl-16β-methyl-9α-fluoro-20-one-21-acetate
17α,21-dihydroxy-4-pregnene-16β-methyl-9α-fluoro-11,20-dione
17α,21-dihydroxy-4-pregnene-16β-methyl-9α-fluoro-11,20-dione-21-acetate
17α,21-dihydroxy-4-pregnene-20-one
17α,21-dihydroxy-4-pregnene-20-one-21-acetate
17α,21-dihydroxy-4-pregnene-16β-methyl-20-one-21-acetate
17α,21-dihydroxy-4-pregnene-16β-methyl-20-one
17α,21-dihydroxy-4-pregnene-16α-methyl-20-one
17α,21-dihydroxy-4-pregnene-16α-methyl-20-one-21-acetate
17α,21-dihydroxy-4-pregnene-6α-methyl-20-one
17α,21-dihydroxy-4-pregnene-6α-methyl-20-one-21-acetate
17α,21-dihydroxy-4,6-pregnadiene-6-methyl-20-one
17α,21-dihydroxy-4,6-pregnadiene-6-methyl-20-one-21-acetate

EXAMPLE 2

A solution of 5 g. of 17α-hydroxy-6α-methyl-4-pregnene-3-one-20,20-ethylendioxy in 250 ml. of dry benzene is treated with 5 ml. of freshly distilled ethyl formate. The air in the system is replaced with nitrogen and 3 g. of sodium hydride (as a 50% dispersion in mineral oil) are added. The mixture is stirred at room temperature overnight. Dry ether is added and the sodium salt is filtered and it is dried under a high vacuum. After 2 hours it is decomposed with a saturated aqueous solution of sodium dihydrogen phosphate and extracted with benzene. The benzene extract washed with water is evaporated to dryness under reduced pressure. The residue is triturated with ether to yield as a crystalline solid, 17α-hydroxy - 6α - methyl-2-hydroxymethylene-4-pregnene-3-one-20,20-ethylendioxy, which is used in the subsequent step of the synthesis without further purification.

The 17α-hydroxy - 6α - methyl-2-hydroxymethylene-4-pregnene-3-one-20,20-ethylendioxy (0.01 mole) is dissolved in 100 ml. of ethanol and treated with a solution of hydroxylamine hydrochloride (0.011 mole) in water. After half an hour the reaction with ferric chloride is negative. The solvent is concentrated under vacuum and the hydrochloric acid is neutralized with a solution (10%) of sodium bicarbonate. Dilution with water gives a precipitate which is filtered and dried over a steam bath. This product is triturated with ether to give 17α-hydroxy-6α-methyl-4-pregnene-20-one - [2,3-d]-isoxazole which is used in the subsequent step of the synthesis without further purification.

To a solution of 500 mg. of 17α-hydroxy-6α-methyl-4-pregnene-20-one-[2,3-d]-isoxazole in 6 ml. of acetic anhydride are added 100 mg. of p-toluenesulfonic acid. The mixture is refluxed for 1 hour. The reaction solution is cooled and 2 ml. of pyridine are added. A mixture of ice and water is then added. After standing for about 30 minutes, the product is extracted with ethyl acetate. The ethyl acetate extract is washed successively with water, ice cold 0.5 N sulphuric acid, saturated aqueous sodium bicarbonate and water (until the aqueous layer is neutral). The ethyl acetate solution is dried with anhydrous sodium sulphate. The solvent is then distilled under vacuum using a water bath as the source of heat. Crystallization of the resulting product yields 17α-acetoxy-6α-methyl-4-pregnene - 20 - one-[2,3-d]-isoxazole.

In accordance with the above procedure, but using an equivalent quantity of another acylating agent in place of acetic anhydride, there is obtained the corresponding 17α-hydroxy-6α-methyl-4-pregnene-20-one - [2,3-d]-isoxazole-17α-acyloxy.

A solution of 6 g. of 17α-acetoxy-6α-methyl-4-pregnene-20-one-[2,3-d]isoxazole in ethanol is treated under stirring with a 1% solution of potassium carbonate at room temperature for 2 hours. The reaction solution is filtered and the filtrate is neutralized with a saturated solution of sodium dihydrogen phosphate. The material which precipitates is recovered by filtration, washed with water and dried to give, after crystallization, 17α-acetoxy-2α-cyano-6α-methyl-4-pregnene-3,20-dione, which is used in the subsequent step of the synthesis without further purification. In the same manner starting with 17α-hydroxy-6α-methyl-4-pregnene-20 - one - [2,3-d] - isoxazole-17α-acyloxy, we obtain, after treatment with 1% solution of potassium carbonate, 17α-hydroxy-2α-cyano-6α-methyl-4-pregnene-3,20 - dione-17α - acyloxy. The 17α-acetoxy-2α-cyano-6α-methyl-4-pregnene-3,20-dione (800 mg.) is dissolved in 40 ml. of ethanol and treated with a 10% solution of hydroxylamine acetate in ethanol. The mixture is refluxed for 2 hours and after cooling the reaction solution is neutralized with sodium bicarbonate; then the solution is concentrated to dryness. The resulting amorphous solid is washed with water and dried again. Crystallization from ethyl acetate yields 17α-acetoxy-6α-methyl-4-pregnene-20-one-[3,2-c] - isoxazole-5'-amino.

A 500 mg. aliquot of the above compound is dissolved in 3 ml. of pure methanol and allowed to react with 0.5 ml. of a 1.33 N solution of sodium methoxide in methanol at room temperature for 10 minutes. The alkoxide is neutralized with acetic acid and the mixture is then taken to dryness. The residue is washed with water, filtered and dried to give, after crystallization, 17α-hydroxy-6α-methyl-4-pregnene-20-one - [3,2-c]-isoxazole-5'-amino.

In accordance with the above procedure, but starting with the corresponding derivatives there are obtained as products,

[3,2-c]-isoxazole-5'-amino
17α-capronate-4-pregnene-20-one
17α-hydroxy-4-pregnene-20-one
17α-acetoxy-6-chloro-4,6-pregnadiene-20-one
17α-hydroxy-6-chloro-4,6-pregnadiene-20-one
17α-acetoxy-6-methyl-4,6-pregnadiene-20-one
17α-hydroxy-6-methyl-4,6-pregnadiene-20-one.

A solution of 1 g. of 17α-hydroxy-6α-methyl-4-pregnene-20-one-[3,2-c]-isoxazole-5'-amino-17α-acetate is dissolved in methanol and treated under stirring with 0.9 ml. of benzaldehyde overnight. The material which separates during this time is recovered by filtration, washed with a small quantity of methanol and dried to give 17α-hydroxy-6α-methyl-4-pregnene-20-one - [3,2-c]-isoxazole-5'-N-benzylidene-17α-acetate.

In accordance with the above procedure, but using an equivalent quantity of acetaldehyde in place of benzaldehyde, there is obtained the corresponding 5'-N-ethylidene derivative.

A solution of 2 g. of 17α,20,20,21-bis(methylendioxy)-6α-methyl-4-pregnene-[3,2-c]-isoxazole-5'-N-ethyl (above described) is heated in a steam bath with 40 ml. of a 60% aqueous solution of formic acid for about 30 minutes. The excess reagent is removed in vacuo and the residue, which is a mixture of 17α,21-dihydroxy-6α-methyl-20-one-4-pregnene-[3,2-c]-isoxazole-5' - N - ethyl and 17α,21-dihydroxy-6α-methyl-20-one-4-pregnene - [3,2-c]-isoxazole-5'-N-ethyl-21-formate.

This crude product is dissolved in 8 ml. of ethanol and allowed to react with 1.5 ml. of a 1.35 N solution of sodium methoxide in methanol at room temperature under nitrogen atmosphere for 10 minutes. The alkoxide is neutralized with acetic acid and the mixture is then taken to dryness. The residue is washed with water, filtered and dried to give 17α,21-dihydroxy-6α-methyl-20-one-4-pregneno-[3,2-c]-isoxazole-5'-N-ethyl.

To a solution of 500 mg. of the above compound in 4 ml. of pyridine cooled to 0° C. are added 0.06 ml. of methane sulfonyl chloride. The resulting mixture is allowed to stand at a temperature of 0° C. for a period of 1 hour, water is then added and the precipitate which forms is recovered by filtration, washed with water and dried to give 17α,21-dihydroxy-6α-methyl-20-one-4-pregneno-[3,2-c]-isoxazole-5'-N-ethyl-21-mesylate.

To 250 mg. of 17α,21-dihydroxy-6α-methyl-20-one-4-pregneno-[3,2-c]-isoxazole-5'-N-ethyl-21 - mesylate dissolved in 15 ml. of acetone are added 400 mg. of sodium iodide. The resulting mixture is heated at reflux temperature for 1 hour and then cooled to room temperature and diluted with water. The material which precipitates is recovered by filtration, washed with water and dried to give 200 mg. of 17α-hydroxy-21-iodo-6α-methyl-20-one-4-pregneno-[3,2-c]-isoxazole-5' - N - ethyl.

The above compound is dissolved in a mixture of 6 ml. of water and 6 ml. of ethanol. To the resulting solution are added 600 mg. of sodium bisulfite and the mixture is heated under reflux for 1 hour. The reaction medium is cooled, diluted with water and the material which separates is recovered by filtration.

The product is washed with water, dried and recrystallized from ethyl acetate to give 17α-hydroxy-6α-methyl-20-one-4-pregnene-[3,2-c]-isoxazole-5'-N-ethyl.

In accordance with the above procedures, but starting with the corresponding derivatives, there are obtained as products, 3,2-c]-isoxazole-5'-N-ethyl- and 5'-N-benzyl- 17α-caproate-4-pregnene-20-one
17α-hydroxy-4-pregnene-20-one
17α-acetoxy-6-chloro-4,6-pregnadiene-20-one
17α-hydroxy-6-chloro-4,6-pregnadiene-20-one
17α-acetoxy-6-methyl-4,6-pregnadiene-20-one
17α-hydroxy-6-methyl-4,6-pregnadiene-20-one To a solution of 200 mg. of 17α-hydroxy-6α-methyl 20-one-4-pregnene-[3,2-c]-isoxazole-5'-N-ethyl in 5 ml. of hexanoic anhydride are added 100 mg. of p-toluenesulfonic acid. The mixture is allowed to stand for 10 hours at room temperature and after completion of the reaction, verified by thin layer chromatography, 2 ml. of pyridine are added. The system is extracted with ether and washed once with water. Steam distillation eliminates the excess of caproic anhydride as caproic acid.

The product is extracted with ethyl acetate and washed with water. The organic layer is dried, and then evaporated to give a semi-solid residue. This residue is flushed 4 times with n-hexane and then dried. Recrystallization from methanol yields 17α-hydroxy-6α-methyl-20-one-4-pregnene-[3,2-c]-isoxazole-5'-N-ethyl-17α-caproate.

In accordance with the above procedures, but using an equivalent quantity of another acylating agent in place of the hexanoic anhydride we obtain the corresponding 17α-acyloxy derivatives.

A solution of 4 g. of 17α,20,20,21-bis(methylendioxy)-6α - methyl - 4 - pregneno - [3,2-c]-isoxazole - 5'-hydroxy (above prepared) dissolved in 80 ml. of 80% (v./v.) acetic acid is heated in a steam bath for 20 minutes. This solution is diluted with 150 ml. of water and extracted with ethyl acetate. The ethyl acetate extracts are washed with water and with a saturated solution of sodium bicarbonate, dried and evaporated to dryness in vacuo to give an amorphous solid, which is a mixture of 17α,21-dihydroxy - 6α-methyl-20-one-4-pregneno-[3,2-c]-isoxazole-5'-acetoxy and 17α,21-dihydroxy-6α-methyl-20-one-4-pregneno-[3,2-c]-isoxazole-5'-acetoxy-21-acetate.

These compounds were separated by chromatography on silica-gel.

To a solution of 1 g. of 17α-dihydroxy-6α-methyl-20-one-4-pregneno-[3,2-c]-isoxazole-5'-acetoxy in 5 ml. of pyridine, cooled at 0° C. are added 0.16 ml. of methane sulfonyl chloride. The resulting mixture is allowed to stand at a temperature of 0° C. for a period of 50 minutes. Water is then added to the mixture and the precipitate which forms is recovered by filtration, washed with water and dried to give 17α,21-dihydroxy-6α-methyl-20 - one - 4 - pregneno - [3,2-c]-isoxazole-5'-acetoxy-21-mesylate.

To 200 mg. of 17α,21-dihydroxy-6α-methyl-20-one-4-pregneno-[3,2-c]-isoxazole-5'-acetoxy - 21 - mesylate dissolved in 15 ml. of acetone are added 350 mg. of sodium iodide. The resulting mixture is heated at reflux temperature for a period of about 1 hour and the reaction solution is cooled to room temperature and diluted with water. The material which precipitates is recovered by filtration, washed with water and dried to give 17α-hydroxy-21-iodo - 6α - methyl-20-one-4-pregneno-[3,2-c]-isoxazole-5'-acetoxy.

The 17α - hydroxy - 21-iodo-6α-methyl-20-one-4-pregneno-[3,2-c]-isoxazole-5'-acetoxy is dissolved in a mixture of 10 ml. of water and 10 ml. of ethanol.

To the resulting mixture is added 1 g. of sodium bisulfite and the mixture is heated under reflux for a period of about 1 hour. The reaction medium is cooled, diluted with water and the material which separates is recovered by filtration. The product is washed with water, dried and recrystallized from ethyl acetate to give 17α-hydroxy-6α - methyl - 20-one-4-pregneno-[3,2-c]-isoxazole-5'-acetoxy.

A 500 mg. aliquot of the above compound is dissolved in 3 ml. of pure methanol and allowed to react with 0.5 ml. of a 1% solution of potassium carbonate in methanol at room temperature for 15 minutes under a nitrogen atmosphere. The potassium carbonate is neutralized with acetic acid and the mixture is then taken to dryness. The residue is washed with water, filtered and dried to give, after crystallization, 17α - hydroxy-6α-methyl-20-one-4-pregnene-[3,2-c]-isoxazole-5'-hydroxy.

To a solution of 500 mg. of 17α-hydroxy-6α-methyl-20-one-4-pregneno-[3,2-c]-isoxazole-5'-acetoxy in 5 ml. of acetic anhydride are added 80 mg. of p-toluenesulfonic acid and the resulting mixture is refluxed for 1 hour. Then 2 ml. of pyridine are added and the mixture is diluted with water. The material which precipitates is recovered by filtration, washed with water and dried to give 17α - hydroxy - 6α-methyl - 20-one-4-pregneno-[3,2-c]-isoxazole-5'-acetoxy-17α-acetate.

In accordance with the above procedure, but using an equivalent amount of another acylating agent in place of acetic anhydride, there is obtained the corresponding 17α-hydroxy - 6α-methyl-20-one-4-pregneno-[3,2-c]-isoxazole-5'-acetoxy-17α-acyloxy.

A 500 mg. aliquot of 17α-hydroxy-6α-methyl-20-one-4-pregneno-[3,2-c]-isoxazole-5'-acetoxy-17α-acetate is dissolved in 3 ml. of pure methanol and allowed to react with 0.5 ml. of 1% solution of potassium carbonate in methanol at room temperature for 15 minutes under a nitrogen atmosphere. The potassium carbonate is neutralized with acetic acid and the mixture is then taken to dryness. The residue is washed with water, filtered and dried to give, after crystallization, 17α - hydroxy - 6α-methyl - 20-one-4-pregneno-[3,2-c]-isoxazole-5'-hydroxy-17α-acetate.

In accordance with the above procedure, but starting with the corresponding derivatives there are obtained as products, [3,2-c]-isoxazole-5'-hydroxy - 17α - hydroxy-, [3,2-c]-isoxazole-5'-hydroxy-17α-acylate- and [3,2-c]-isoxazole-5'-acyloxy-17α-acyloxy- 17α-caproate-4-pregnene-20-one
17α-hydroxy-4-pregnene-20-one
17α-acetoxy-6-chloro-4,6-pregnadiene-20-one
17α-hydroxy-6-chloro-4,6-pregnadiene-20-one
17α-acetoxy-6-methyl-4,6-pregnadiene-20-one
17α-hydroxy-6-methyl-4,6-pregnadiene-20-one By treating 200 mg. of 17α-hydroxy-6α-methyl-4-pregnene-20-one-[3,2-c]-isoxazole-5'-amino with acetic anhydride and p-toluenesulfonic acid under reflux for 1 hour, we obtain 17α - hydroxy - 6α-methyl-4-pregnene-20-one-[3,2-c]-isoxazole-5'-acetamido-17α-acetate.

In accordance with the above procedure, but using another acylating agent, we can obtain the corresponding derivatives.

A solution of 200 mg. of 17α-hydroxy-6α-methyl-4-pregnene - 20-one-[3,2-c]-isoxazole-5'-acetamido-17α-acetate dissolved in 8 ml. of methanol is treated with 1 ml. of 1.33 N sodium methoxide in methanol for 10 minutes at room temperature under nitrogen atmosphere. The alkoxide is neutralized with acetic acid and the mixture is then taken to dryness. The residue is washed with water, filtered and dried. Crystallization from ether gives 17α - hydroxy - 6α - methyl-4-pregnene-20-one-[3,2-c]-isoxazole-5'-acetamido.

What we claim is:
A compound of the formula

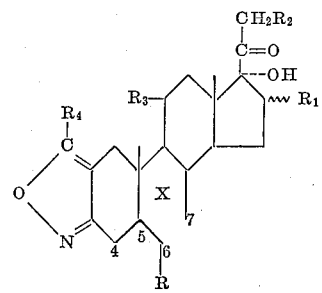

wherein R is a member selected from the group consisting of hydrogen, methyl, chloro and fluoro; $R_1$ is a member selected from the group consisting of hydrogen, α-methyl and β-methyl; $R_2$ is a member selected from the group consisting of hydrogen, hydroxy and acyloxy in which the acyl radical is derived from a carboxylic acid of from 1 to 10 carbon atoms; $R_4$ is a member selected from the group consisting of amino, lower alkylamino, benzylamino, lower acylamino, hydroxy, acyloxy in which the acyl radical is derived from a carboxylic acid of from 2 to 10 carbon atoms, and alkoxy of from 1 to 4 carbon atoms; X is a member selected from the group consisting of hydrogen and fluoro and the bonds between the 4, 5- and 6, 7-carbon atoms are selected from the group consisting of a single bond and a double bond.

References Cited by the Examiner
UNITED STATES PATENTS 3,100,771 8/1963 Manson _____ 260—239.55
3,135,743 6/1964 Clinton _____ 260—239.55

OTHER REFERENCES

Kissman et al.: Jour. Org. Chem. vol 27, pp. 3168–75 (1962).

Caspi et al.: Chemistry and Industry, pp. 1984–85, Nov. 17, 1962.

ELBERT L. ROBERTS, *Acting Primary Examiner.*
HENRY A. FRENCH, *Assistant Examiner.*